United States Patent

Diels

[11] Patent Number: 6,052,859
[45] Date of Patent: Apr. 25, 2000

[54] SCRAPER ARRANGEMENT

[75] Inventor: Wolfgang Diels, München, Germany

[73] Assignee: Gebr. Hennig GmbH, Ismaning, Germany

[21] Appl. No.: 09/114,626

[22] Filed: Jul. 13, 1998

[30] Foreign Application Priority Data

Jul. 14, 1997 [DE] Germany ............................ 197 30 120

[51] Int. Cl.[7] .............................. B23G 11/08; F16C 17/00
[52] U.S. Cl. .............................. 15/256.5; 15/246; 160/11; 160/222; 220/8; 277/550; 277/576; 384/15
[58] Field of Search .................................. 15/246, 256.5; 160/11, 202, 222; 220/8; 277/343, 550, 551, 576; 384/15

[56] References Cited

U.S. PATENT DOCUMENTS

| | | | |
|---|---|---|---|
| 3,659,306 | 5/1972 | Stoltze et al. | 15/246 |
| 3,691,588 | 9/1972 | Hennig et al. | 15/256.5 |
| 3,964,801 | 6/1976 | Steinmetz | 15/256.5 X |
| 4,099,798 | 7/1978 | Steinmetz | 15/246 X |
| 4,447,929 | 5/1984 | Hennig et al. | 15/256.5 |
| 4,860,917 | 8/1989 | Stohr | 220/8 |
| 5,058,232 | 10/1991 | Stohr | 15/256.5 X |
| 5,377,379 | 1/1995 | Lo | 15/246 |
| 5,379,480 | 1/1995 | Lo | 15/246 |

FOREIGN PATENT DOCUMENTS

| | | | |
|---|---|---|---|
| 135462 | 5/1979 | Germany | 15/246 |
| 2937307 | 4/1981 | Germany | 384/15 |

*Primary Examiner*—Mark Spisich
*Attorney, Agent, or Firm*—Thomas, Kayden, Horstemeyer & Risley

[57] ABSTRACT

The invention relates to a scraper arrangement for attachment to at least one of at least two machine parts which are movable relative to one other, particularly for protection of guideways in machine tools. In this case a scraper strip made from elastically deformable material is replaceably retained on a rigid carrier strip which for its part is releasably connected to a machine part. With a view to a reliable attachment and quick replacement of carrier strip and scraper strip, at least one approximately strip-shaped intermediate carrier can be firmly attached to one machine part and with the aid of at least one C-shaped clamp can be replaceably fixed on a front end edge region of the machine part.

10 Claims, 2 Drawing Sheets

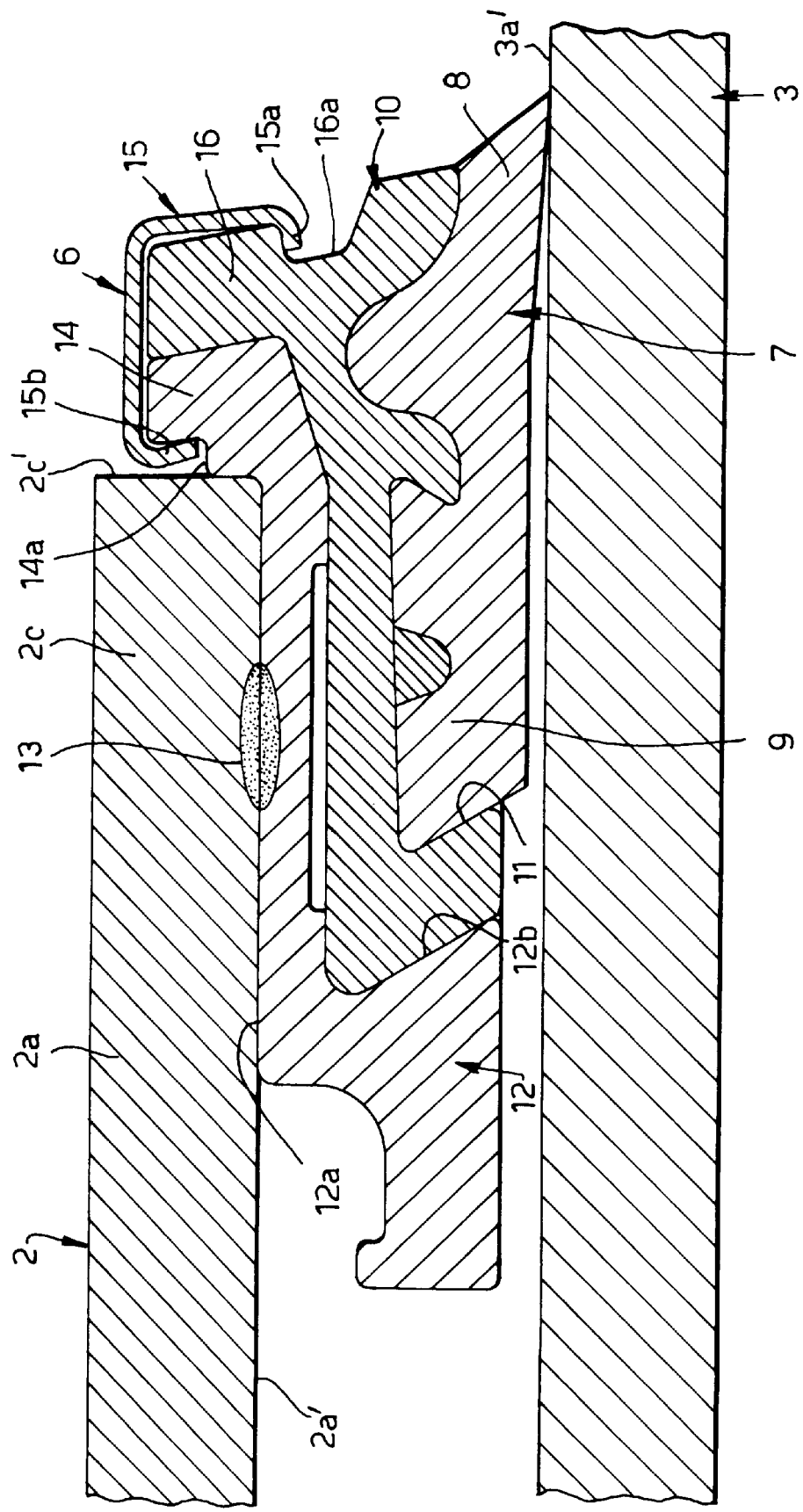

SCRAPER ARRANGEMENT

The invention relates to a scraper arrangement for attachment to at least one of at least two machine parts, of which one is movable relative to the other, particularly in the case of machine tools for protection of guideways and for attachment to telescopic covers for such guideways, according to the preamble to claim 1.

Various types of construction of scraper arrangements are already known in the art. In the case of machine tools they are in particular attached to machine parts of which at least one is movable relative to the other. This can for example be a support or the like which is movable along a guideway, wherein the guideway(s) should be freed or kept free of contaminants (e.g. swarf, dust, fluids or the like) with the aid of correspondingly attached scraper arrangements. The situation is similar when scraper arrangements are attached to so-called telescopic covers with at least two cover boxes which can be pushed into one another and pushed apart telescopically and by means of which guideways can be kept free of the aforementioned contaminants during processing of workpieces. In these cover boxes the scraper arrangement attached to the front edges of the cover boxes ensure that in particular when the cover boxes are pushed into one another the outer surfaces thereof are also kept free of the said contaminants and these contaminants cannot reach the interior of the cover boxes, i.e. cannot reach the guideways which are to be protected.

Since the above-mentioned contaminants can be both mechanically and chemically aggressive materials, it is not possible to prevent the actual scraper elements, namely the scraper strips produced from elastically deformable material and in particular the scraper lips thereof, from becoming so severely damaged with time that a satisfactory scraping and/or sealing effect can no longer be guaranteed. Thus these scraper strips must be replaced by new scraper strips from time to time. For this reason it is known for the profiled scraper strips to be constructed with a rear retaining lug when viewed in the profile cross-section—which is replaceably received (and in fact to a certain extent snapped in) and retained in a correspondingly profiled retaining recess of the rigid carrier strip. If in this case the carrier strip is firmly attached in the corresponding machine part, e.g. a cover box of a telescopic cover, then this machine part must be dismantled or removed in order to be able to replace the scraper strip. However, this is very awkward and time-consuming, and the associated machine tool must be shut down during the replacement work.

In order to simplify this work of replacing scraper strips and to be able to carry it out more quickly, it has also already been proposed to replace the rigid carrier strip and the scraper strip retained therein to a certain extent as a unit, for which purpose the carrier strip is for example loosely connected with the aid of screws to a first machine part. For example in the case of telescopic cover boxes this is achieved in such a way that over the length of the carrier strip on the rear edge opposite the scraper lip a plurality of threaded bores are machined in, into which are screwed fixing screws which pass through the corresponding wall regions of the appertaining cover box. This does indeed essentially avoid awkward dismantling of the machine parts, for example the individual cover boxes; however, for the possibilities of replacing a carrier strip provided with a scraper strip it is necessary on the one hand to ensure extremely accurate application of the corresponding bores (through borers on a machine part and threaded bores on the carrier strip) and on the other hand to align the machine part to be newly applied exactly relative to the machine part to receive it—particularly in the transverse direction—before the fixing screws can be screwed in precisely into the appertaining threaded bores. Therefore this work of replacing scraper strips is still relatively awkward and time-consuming.

The object of the invention, therefore, is to improve a scraper arrangement according to the preamble to claim 1 over the known constructions described above in such a way that the carrier strip bearing the scraper strip can be replaced quickly by relatively simple constructional means and with sufficiently precise and reliable attachment on the machine part.

This object is achieved according to the invention by the characterising features of claim 1.

Advantageous embodiments and further developments of the invention are the subject matter of the subordinate claims.

In a scraper arrangement according to the invention at least one strip-shaped intermediate carrier can be firmly attached to the first machine part, this intermediate carrier extending parallel to the carrier strip and to the scraper strip and having the carrier strip replaceably fixed on it by at least one connecting element which engages on a portion of the intermediate carrier which projects on the end face from the first machine element. Due to this construction, arrangement and fixing of the unit consisting of carrier strip and scraper strip on the intermediate carrier, with a simple design on the one hand a good and direct access is ensured to the connecting elements attached forward and exposed on the end face and on the other hand gripping and replacement on the end face of the unit consisting of the carrier strip and scraper strip is ensured, which brings with it a very quick replacement of worn scraper strips—avoiding dismantling of machine parts. The reliable fixing of the unit consisting of the carrier strip and scraper strip on the firmly attached intermediate carrier can be ensured by cross-sectional profiling of the carrier strip and intermediate carrier to match each other.

According to the invention the or each connecting element is formed by a clamp which is approximately C-shaped in cross-section and which on the one hand engages round a portion of the intermediate carrier projecting on the end face from the first machine part and on the other hand engages around a front end part of the carrier strip in such a way that the profile faces which lie against one another of the intermediate carrier and carrier strip are pressed flat against one another. Due to this extremely simple design feature the unit consisting of the carrier strip and scraper strip can be particularly easily and quickly released or replaced, but can be absolutely securely fixed on the intermediate carrier which for its part is carried fixed, i.e. not replaceably, by the first machine part. This releasable fixing of the carrier strip on the intermediate carrier with the aid of at least one clamp also brings with it the further advantage that awkward alignment work which may be necessary during fixing by screws can be omitted, but nevertheless a reliably precise attachment of the unit consisting of the carrier strip and scraper strip on the intermediate carrier is ensured.

According to an advantageous embodiment of the invention this scraper arrangement is characterised by its adaptation to a telescopic cover which is designed as a protective cover for guideways on machine tools and has at least two cover boxes which form the machine parts, of which at least one cover box can be pushed telescopically to the other and at least the first cover box in the region of its front end edge replaceably retains at least one unit consisting of a scraper strip, which is in scraping engagement with the outer face of the second cover box, and a carrier strip by means of at least one clamp on an appertaining intermediate carrier which is fixed in this front edge region on the first cover box. In this way the scraper arrangement constructed according to the invention is quite especially well adapted for attachment to cover boxes of such telescopic covers. When it is necessary to replace a scraper strip the telescopic cover as a whole can remain in the assembled operating state, and a unit consisting of carrier strip and scraper strip is withdrawn quickly and without problems on the end face after removal of the clamp(s) and a new unit is inserted on the end face and clamped again.

In this scraper arrangement according to the invention, at least the cover boxes as well as each intermediate carrier are produced from steel, and in this case each intermediate carrier is preferably fixed by spot welds on the appertaining cover box, which brings with it a quick installation of the intermediate carriers on the cover boxes.

The fixing clamps can be made from any suitable material. However, it is particularly advantageous if each clamp is made from spring steel so that it can be guided particularly robustly and stably and can apply the necessary fixing forces.

Further details of the invention are apparent from the following description with reference to the drawings, in which:

FIG. 2 shows a cross-sectional detail view on an enlarged scale particularly through the scraper arrangement according to the invention, corresponding to the section line II—II in FIG. 1.

Figure 1:
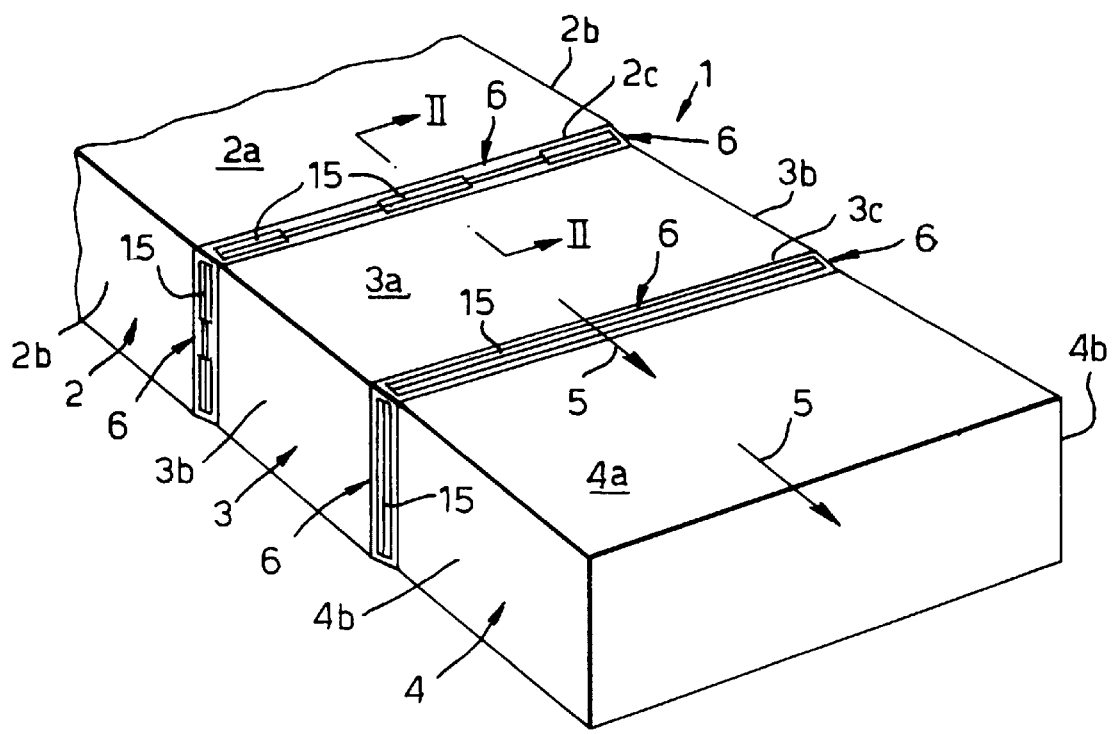
FIG. 1 shows a perspective partial view of a telescopic cover for machine tools with scraper arrangements according to the invention attached to some cover boxes.

The telescopic cover 1 which is illustrated in FIG. 1 only in a perspective partial view constitutes an especially preferred embodiment of how and where a scraper arrangement according to the invention or a plurality of such scraper arrangements can be particularly advantageously attached. Such a telescopic cover 1 is used with machine tools in order thereby above all to protect guideways against, or keep them free of, contaminants (e.g. metal shavings, dust, lubricants and the like). In this case the telescopic cover essentially consists of a corresponding number of cover boxes 2, 3, 4 which can be pushed into one another and pulled apart. Of these, one cover box fixed on one end of the telescopic cover can be firmly connected to a part of the machine tool (for example on a movable part) and another cover box located at the opposite end of the telescopic cover 1 can be firmly connected to a corresponding other part of the machine tool (for example a stationary part), so that the individual cover boxes 2, 3, 4 are moved telescopically relative to one another on the machine tool according to the particular working operation. In FIG. 1 the telescopic pulling apart of the cover boxes 2, 3, 4 is indicated by arrows 5; the telescopic pushing together takes place correspondingly against the direction of the arrows 5.

Thus in this embodiment according to the drawings it may be assumed that the machine parts on which the scraper arrangement according to the invention is attached are formed by the individual cover boxes 2, 3, 4 of the telescopic cover 1. It can also be seen from FIG. 1 that each cover box 2, 3, 4—in this embodiment—has a top wall 2a, 3a and 4a respectively and two side walls 2b, 3b and 4b respectively disposed at an angle thereto. In order that a guideway—which is not shown in detail in the drawings because it is known—of a machine tool can be reliably covered and protected, in this embodiment of the telescopic cover 1 scraper arrangements 6 according to the present invention are attached on the front end edge regions or rims of the cover boxes 2 and 3, both on the top walls 2a, 3a and on the side walls 2b, 3b—when viewed in the withdrawal direction according to the arrows 5.

The construction according to the invention of the or each scraper arrangement 6 will be explained in greater detail below with reference to FIG. 2, i.e. the scraper arrangement 6 illustrated here is one which is attached on the front edge region 2c of the top wall 2a of the cover box 2 into which the next smaller cover box 3 can be pushed telescopically and from which this cover box 3 can be withdrawn again (as is known per se).

Each scraper arrangement 6 basically comprises at least one profiled scraper strip 7 which is produced from an elastically deformable material (e.g. a corresponding plastics material or rubber) and has constructed or formed on the front region of its profile cross-section a scraper lip 8 and on the rear region of its profile cross-section a retaining lug 9, which in the present example essentially has a dovetail cross-section. This scraper arrangement 6 also has at least one carrier strip 10 which is likewise profiled and is produced from rigid material (e.g. steel, aluminium, sufficiently rigid plastics material or the like) and which has a profile or retaining recess 11 constructed in the rear profile cross-section to receive and retain the scraper strip 7 so that it is replaceable.

Furthermore, each scraper arrangement 6 includes at least one approximately strip-shaped intermediate carrier 12 which is attached firmly, i.e. not replaceably, on the appertaining machine part, in this case on the front end region 2c. In the present case the plane upper outer face 12a lies flat on the underside 2a' of the top wall 2a. This intermediate carrier is likewise produced from rigid material, preferably from steel, so that in the case of cover boxes 2, 3, 4 which are also produced from steel this or each intermediate carrier 12 can be fixed—as indicated at 13—on the appertaining cover box, e.g. cover box 2.

The scraper strip 7, the carrier strip 10 and the intermediate carrier 12 extend substantially parallel to one another and parallel to the appertaining front edge 2c' of the top wall 2a. In this case the scraper lip 8 which tapers to a point towards the front rests so as to form a seal on the outer surface 3a' of the top wall 3a of the cover box 3 lying below it.

As has already been mentioned further above, the carrier strip 10 and the scraper strip 7 retained thereby to some extent form a replaceable unit which is fixed releasably, that is to say replaceably, on the intermediate carrier 12. For this purpose at least one corresponding connecting element, but preferably a plurality of similar connecting elements 15 are provided which engage on a portion 14 of the intermediate carrier 12 projecting on the end face from the appertaining cover box 2, in such a way that the connecting element thus fixes the carrier strip 10 on the intermediate carrier 12.

As can be clearly seen in FIG. 2, the intermediate carrier 12 has on its side facing the carrier strip a cross-sectional profile such that at least the rear region of the external profile of the carrier strip 10 can be received in a form-locking manner with at least an undercut 12b and when the connecting element 15 is released the carrier strip 10 together with the scraper strip 7 can be pulled out forwards on the front end from the intermediate carrier 12 (and pushed in again in the opposite direction), that is to say it can be replaced in a simple manner. In this case if the rear regions of the cross-sectional profiles of the intermediate carrier 12 and carrier strip 10 are constructed somewhat like corresponding half dovetail profiles—as shown in FIG. 2—then in a particularly advantageous manner interengaging undercuts are formed thereby by which the carrier strip 10 is firmly clamped against the intermediate carrier 12 when the connecting elements 15 are attached.

With this construction of the scraper arrangements 6 according to the invention it has proved particularly advantageous for the or each connecting element 15 to be formed by a clamp 15 of C-shaped cross-section which on the one hand engages around the portion 14 of the intermediate carrier 12 projecting on the end face from the appertaining cover box 2 or 3, and on the other hand engages around a front end part 16 of the carrier strip 10 in such a way that—as can be seen in FIG. 2—the profile faces of the intermediate carrier 12 and carrier strip 10 which lie against one another are pressed flat against one another. This ensures a fixing of the unit consisting of carrier strip 10 and scraper strip 7 which is very easy to produce and to release but is extremely stable.

Basically each unit consisting of scraper strip 7 and carrier strip 10 can be clamped firmly by a plurality of clamps 15 attached spaced from one another over the length of the strip or also with the aid of one single continuous clamp 15. This situation is indicated in FIG. 1, according to which the or each scraper arrangement 6 on the rear cover box 2 is equipped with a plurality of clamps 15, whilst each scraper arrangement 6 attached on the front edge region 3c of the middle cover box 3 in each case contains a continuous connecting clamp 15.

It should also be noted at this point that each clamp 15 is advantageously made from spring steel of a suitable material thickness.

The or each clamp 15 is—as can be seen in the drawings—likewise constructed approximately in the form of a strip, runs parallel to the carrier strip 10 and intermediate carrier 12 and—viewed in cross-section (FIG. 2)—has long edges 15a and 15b which are bent or angled inwards and which engage in matching cut-outs 14a or 16a respectively on the one hand on the upper face of the portion 14 belonging to the intermediate carrier 12 and on the other hand on the front end face, i.e. on the front end part 16, of the carrier strip 10. Thus a reliable clamp connection or bracing between the portion 14 and the part 16 and thus between the principal elements thereof, namely the carrier strip 10 on the intermediate carrier 12, is created.

By means of the construction according to the invention of each scraper arrangement 6 as well as the adaptation thereof to the cover boxes 2, 3, in the illustrated embodiment both in the front end edge region 2c of the cover box 10 and in the front end edge region 3c of the cover box 3 a group of units each consisting of a scraper strip 7, which is in scraping engagement with the outer face, e.g. 3a', of the second cover box in each case 3 or 4 respectively, and a carrier strip 10 is replaceably retained by means of associated clamps 15 on the associated intermediate carrier 12 which is in each case permanently fixed on the corresponding front edge region 2c or 3c, preferably firmly attached by spot welds 13.

Although the possibility for attachment of the scraper arrangement 6 according to the invention which has been described above with reference to FIGS. 1 and 2 is particularly preferred because of the extremely advantageous possibilities for attachment and use on telescopic covers or cover boxes, such a scraper arrangement could also be attached to other machine parts where similar scraping or sealing conditions are reasonable between machine parts which are movable relative to one another. An example of this might be the attachment of a scraper arrangement to a machine tool part, for example a support, which is movable along a guideway.

What is claimed is:

1. A scraper arrangement for attachment to a first machine part (2, 3, 4), the first machine part being movable relative to a second machine part and for attachment to telescopic covers for protecting guideways, said scraper arrangement comprising a) at least one profiled scraper strip (7) produced from elastically deformable material and having a front region, a scraper lip (8) constructed in the front region, and a rear retaining lug (9), b) at least one profiled carrier strip (10) produced from rigid material and having a profile face a rear profile cross-section, and a recess (11) constructed in the rear profile cross-section to retain the scraper strip (7) such that the scraper strip is replaceable and releasably connected to the first machine part (2, 3), characterized in that:

c) at least one strip-shaped intermediate carrier (12) having a profile face, the intermediate carrier being configured to attach to the first machine part (2, 3), the intermediate carrier extending parallel to the carrier strip (10) and to the scraper strip (7) and having the carrier strip replaceably fixed thereon by at least one clamp (15) approximately C-shaped in cross-section, the at least one clamp engaging about a portion (14) of the intermediate carrier (12) projecting on an end face from the first machine part (2, 3) and engaging about a front end part (16) of the carrier strip (10) such that the profile faces of the intermediate carrier and the carrier strip are pressed flat against one another.

2. The scraper arrangement as claimed in claim 1, characterized by a cross-sectional profile of the intermediate carrier (12) on its side facing the carrier strip (10) such that at least a rear region of the carrier strip (10) is received in a form-locking manner with at least an undercut (12b) and, when the clamp (15) is released, the carrier strip together with the scraper strip (7) are configured to be replaced forwards on a front end from the intermediate carrier (12).

3. The scraper arrangement as claimed in claim 1, characterized in that rear regions of cross-sectional profiles of the intermediate carrier (12) and the carrier strip (10) are constructed with approximately half dovetail-shaped profiles which form interengaging undercuts and by which the carrier strip is clamped against the intermediate carrier.

4. The scraper arrangement as claimed in claim 1, characterized in that the each clamp (15) is constructed approximately in the form of a strip, runs parallel to the carrier strip (10) and the intermediate carrier (12) and, as viewed in cross-section, has long edges (15a, 15b) which are bent inwards and which engage in matching cut-outs (14a, 16a), a first of the cut-outs being formed on an upper face of the intermediate carrier (12) and a second of the cut-outs being formed on the front end part (16) of the carrier strip (10).

5. The scraper arrangement as claimed in claim 1, characterized by its adaptation to a telescopic cover (1) which is designed as a protective cover for guideways on machine tools,, the telescopic cover having first and second cover boxes (2, 3, 4) which form the first and second machine parts, of which at least one of the cover boxes can be pushed telescopically to the other and at least one of the cover boxes (2, 3) in a front edge region (2c, 3c) replaceably retains at least one unit comprising: at least one of the scraper strips (7), which is in scraping engagement with an outer face (3a) of the other cover box (3, 4), and at least one of the carrier strips (10) by means of at least one clamp (15) on an appertaining intermediate carrier (12) which is fixed in the front edge region (2c, 3c) on the corresponding cover box.

6. The scraper arrangement as claimed in claim 5, in which each cover box has a top wall and two side walls disposed at an angle thereto, characterized in that on a front end edge region of the top wall (2a, 3a) and of the side walls (2b, 3b) of at least one cover box (2, 3), a unit comprising: at least one of the scraper strips (7) and at least one of the carrier strips (10) being replaceably retained by means of clamps (15) on at least one of the intermediate carriers (12).

7. The scraper arrangement as claimed in claim 5, characterized in that at least the cover boxes (2, 3, 4) and each intermediate carrier (12) are produced from steel and each intermediate carrier is fixed by spot welds (13) on the appertaining cover box.

8. The scraper arrangement as claimed in claim 5, characterized in that each unit is firmly clamped on the appertaining intermediate carrier (12) by a substantially continuous clamp (15).

9. The scraper arrangement as claimed in claim 5, characterized in that each unit is firmly clamped by a plurality of clamps (15) spaced from one another over a length of the strip.

10. The scraper arrangement as claimed in claim 1, characterized in that each clamp (15) is produced from spring steel.

* * * * *